(12) United States Patent
Faller et al.

(10) Patent No.: US 10,028,141 B2
(45) Date of Patent: Jul. 17, 2018

(54) METHOD AND SYSTEM FOR DETERMINING THAT A SIM AND A SIP CLIENT ARE CO-LOCATED IN THE SAME MOBILE EQUIPMENT

(71) Applicant: IPCO AS, Halden (NO)

(72) Inventors: Torbjoern Faller, Skedsmokorset (NO); Rolf Roesok, Raade (NO)

(73) Assignee: IPCO AS, Halden (NO)

( * ) Notice: Subject to any disclaimer, the term of this patent is extended or adjusted under 35 U.S.C. 154(b) by 0 days.

(21) Appl. No.: 15/118,479

(22) PCT Filed: Feb. 10, 2015

(86) PCT No.: PCT/EP2015/052782
§ 371 (c)(1),
(2) Date: Aug. 11, 2016

(87) PCT Pub. No.: WO2015/121263
PCT Pub. Date: Aug. 20, 2015

(65) Prior Publication Data
US 2017/0208450 A1 Jul. 20, 2017

(30) Foreign Application Priority Data
Feb. 12, 2014 (NO) .................................. 20140180

(51) Int. Cl.
*H04W 12/06* (2009.01)
*H04W 8/10* (2009.01)
(Continued)

(52) U.S. Cl.
CPC ......... *H04W 12/06* (2013.01); *H04L 61/6054* (2013.01); *H04W 8/10* (2013.01);
(Continued)

(58) Field of Classification Search
CPC ..... H04W 12/06; H04W 12/04; H04W 12/08; H04W 12/12; H04L 63/0876;
(Continued)

(56) References Cited

U.S. PATENT DOCUMENTS 7,546,459 B2 * 6/2009 Robles ................ H04L 63/0853
380/270
9,503,879 B2 * 11/2016 Faller ...................... H04W 8/00
(Continued)

FOREIGN PATENT DOCUMENTS

WO 2007/093989 A2 8/2007
WO 2007/120921 A2 10/2007

OTHER PUBLICATIONS

International Search Report dated May 13, 2015 for International Patent Application No. PCT/EP2015/052782, 4 pages.
(Continued)

*Primary Examiner* — Magdi Elhag
(74) *Attorney, Agent, or Firm* — Kilpatrick Townsend & Stockton LLP

(57) ABSTRACT

A method and system for determining that a SIM and a SIP client are co-located in the same ME. A SIP server, an SLR, and the ME are communicatively interconnected in the system. The SIM has an IMSI and is arranged in the ME. In the method and system, a security module, SLM-SM, included in SIM, encrypts, using a key, a variable derived from the IMSI, and provides a first password parameter as a result of the encrypting. Further, a SIP client location manager, SLM, included in the ME, receives the ME security code; performs an XOR operation of the ME security code and the identity of the ME, and provides a second password parameter as a result of the XOR operation. The SLR performs a process for SIP client presence and location update for mobile operators MSISDN, including receiving the second password parameter from the SLM via the SIP
(Continued)

server, decrypting the second password parameter using the key, performing an XOR-operation of the decrypting result with a seed; comparing the result of the XOR-operation with the IMSI, and upon match, determining that the SIM and the SIP client are co-located in the same ME.

14 Claims, 3 Drawing Sheets

(51) Int. Cl.
*H04L 29/12* (2006.01)
*H04W 12/04* (2009.01)
*H04W 60/00* (2009.01)
*H04W 12/08* (2009.01)
*H04L 29/06* (2006.01)
*H04W 88/06* (2009.01)
*H04W 84/12* (2009.01)

(52) U.S. Cl.
CPC ........... *H04W 12/04* (2013.01); *H04W 12/08* (2013.01); *H04W 60/005* (2013.01); *H04L 63/0853* (2013.01); *H04L 65/1006* (2013.01); *H04W 84/12* (2013.01); *H04W 88/06* (2013.01)

(58) Field of Classification Search
CPC ............... H04L 63/083; H04L 63/0853; H04L 63/0892; H04L 63/08; H04L 61/6054; H04L 63/0435; H04L 63/062; H04L 63/107; H04L 2463/082; H04L 63/0884; H04L 9/0844; H04L 9/0861; H04L 9/30; H04L 2463/061; H04L 61/203; H04L 63/0442; H04L 63/0471; H04L 9/3242; H04L 9/3263
See application file for complete search history.

(56) References Cited

U.S. PATENT DOCUMENTS

| 2005/0135622 | A1* | 6/2005 | Fors ........................ H04L 63/06 380/268 |
| 2007/0254648 | A1 | 11/2007 | Zhang et al. |
| 2008/0092212 | A1* | 4/2008 | Patel ....................... H04L 12/66 726/3 |
| 2008/0293382 | A1* | 11/2008 | Lubenski ................ H04L 63/08 455/411 |
| 2009/0247120 | A1* | 10/2009 | Heutschi ............. H04L 63/0853 455/406 |
| 2010/0085937 | A1 | 4/2010 | Pressley et al. |

OTHER PUBLICATIONS

Written Opinion dated May 13, 2015 for International Patent Application No. PCT/EP2015/052782, 6 pages.

* cited by examiner

METHOD AND SYSTEM FOR DETERMINING THAT A SIM AND A SIP CLIENT ARE CO-LOCATED IN THE SAME MOBILE EQUIPMENT

CROSS-REFERENCE TO RELATED APPLICATIONS

This application is a U.S. National Phase of International Application No. PCT/EP2015/052782, filed Feb. 10, 2015, which claims priority to Norwegian Application No. 20140180, filed Feb. 12, 2014, the disclosures of which are incorporated by reference herein.

FIELD OF THE INVENTION

The present invention relates in general to mobile communication technology. More specifically, the invention relates to a method and a system for determining that a SIM and a SIP client are co-located in the same mobile equipment (ME).

BACKGROUND OF THE INVENTION

Smartphone applications (apps) software environment limits the communications between an app and a SIM-card applet. Most smartphone operating systems do not offer any API (application programming interface) for SIM-card applet access. Some smartphones offer app developers access to the mobile equipment's identity, while others only offer access to the unit identity with no relationship to the identity parameters stored in SIM card.

SIP (Session Initiation Protocol) is a signaling communications protocol generally used for controlling communication sessions, including voice and video, over Internet Protocol (IP) networks. Mobile operators offering SIP clients for their mobile subscribers based on passwords for SIP registration might experience that SIP registration is initiated from another device than the mobile equipment containing a SIM card associated with the mobile subscription MSISDN. MSISDN (mobile subscriber) is an identification uniquely identifying a mobile subscription.

Mobile operators offering SIP on Wi-Fi integrated on the mobile subscription MSISDN will experience that HLR (Home Location Register) is not updated with the presence information from a mobile equipment registered on a SIP server. Incoming calls received when the SIP client is outside Wi-Fi network coverage will not reach the end-user SIP client mobile equipment while the calling party will experience a no-answer call attempt from the mobile operator.

Several pieces of mobile equipment (mobile devices) can be associated with a mobile subscription. Each device will contain a SIM card and the mobile identity will be used to identify the mobile station. A subscriber with a Twin SIM subscription can use two devices for mobile services. Routing preferences in the mobile operator will direct incoming calls to the preferred device in the case that both devices is available for receiving calls. In a case where the Twin SIM concept is applied to a combination of a SIP client and a standard GSM user on the same mobile equipment, incoming calls directed towards the SIP client while the mobile equipment is outside the Wi-Fi coverage will not be answered. This may result in a long delay before the call is redirected to the Twin over GSM.

U.S. 2007/254648 relates to a system for using dual mode handsets or «softphone» clients for voice, message and data services. The system includes, i.a., a SIP user agent with SIM based authentication and location update. U.S. 2007/254648 ensures that SIM and SIP user agent are co-located in the same ME by using internal communication on the device. However, no open APIs exist for a smartphone App to communicate with the SIM card. So the SIP user agent in U.S. 2007/254648 cannot be implemented as an Sip Client App.

There is need for an improved, secure method for determining that a SIM and a SIP client are co-located in the same ME, in particular without relying on direct, internal communication between the SIM and the SIP client.

SUMMARY OF THE INVENTION

Advantages over the background art are provided by a method and a system for determining that a SIM and a SIP client are co-located in the same mobile equipment, as set forth in the appended independent claims.

Advantageous and alternative embodiments are set out in the dependent claims.

Additional features, principles and advantages of the present invention will be recognized from the detailed description below. It is to be understood that both the foregoing general description and the following detailed description are exemplary and explanatory only and are not restrictive of the invention, as claimed.

Some further possible, particular advantages of certain disclosed aspects include:
   Activation of SIP telephony subscription is invoked from a mobile equipment containing the subscriber's SIM card.
   A SIP client app accessing the SIP telephony service is running on a mobile equipment containing the subscriber's SIM card.
   A successful SIP client authentication will be registered as a roaming event in the Operator's HLR.
   An incoming call to an unreachable SIP client will result in will update HLR with an unreachable status. This means that later calls to the subscriber will be rejected. A new SIP registration is needed to set the HLR status to reachable.
   Ensuring at least some of the above features without any need for a direct communication between the SLM app running on a mobile equipment and the SIM card in the mobile equipment.

DETAILED DESCRIPTION OF THE INVENTION

The invention will be described by exemplary embodiments in the following detailed description.

Figure 1:
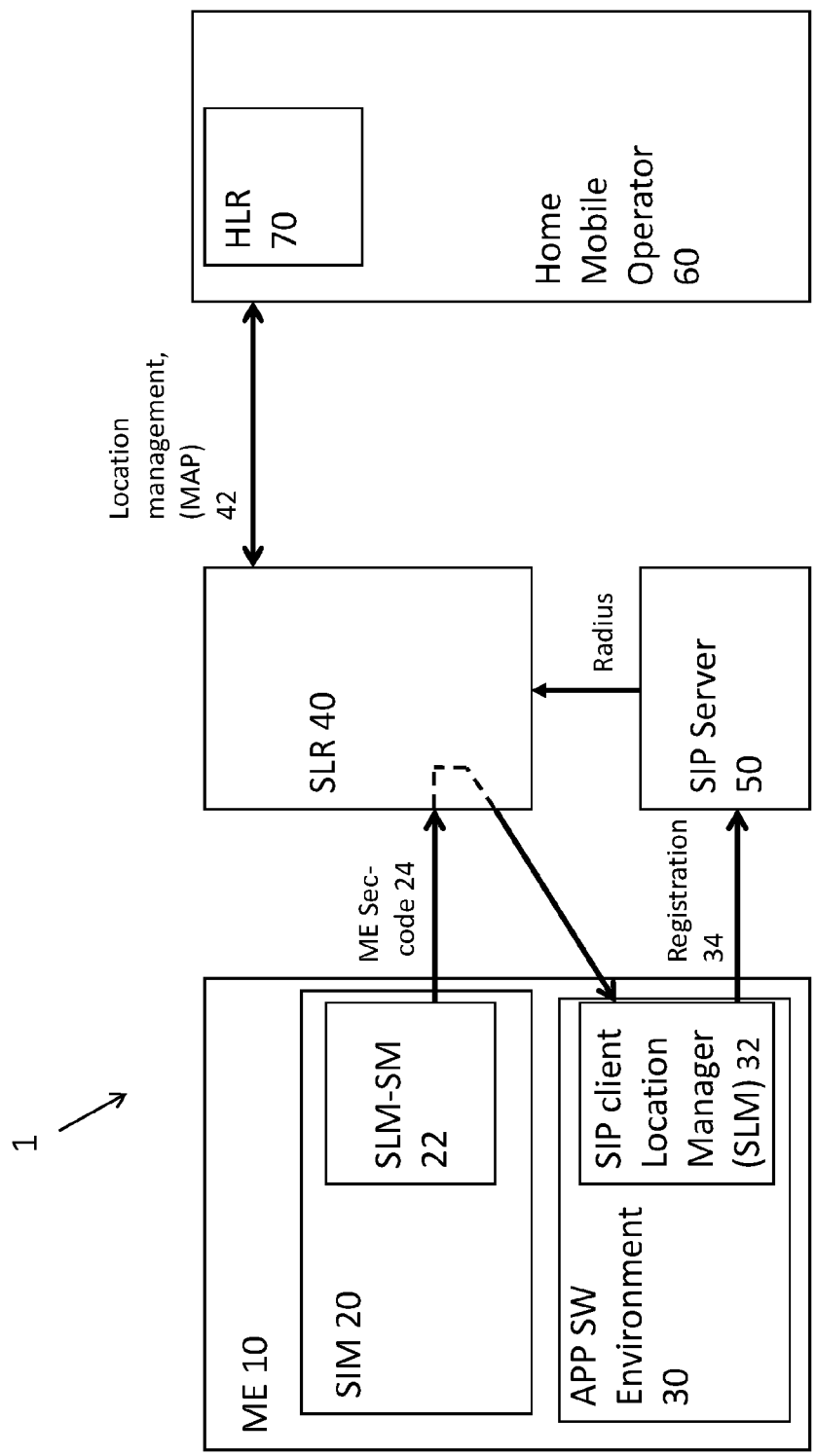
FIG. 1 is a schematic block diagram illustrating a mobile communication system in which a method for determining that a SIM and a SIP client are co-located in the same mobile equipment may be performed.

FIG. 1 is a schematic block diagram illustrating a mobile communication system 1 in which a method for SIP location management using SIM may be performed.

More particularly, a method for determining that a SIM and a SIP client are co-located in the same mobile equipment may be performed in the system 1.

Structurally, the mobile communication system 1 comprises at least one or a plurality of mobile equipment, ME, 10. Each mobile equipment ME 10 may, e.g., be a smartphone, a tablet computer, a portable computer or any other portable communication device which is enabled to communicate by mobile communication, such as 4G, 3G, GSM, etc.

Particularly, the ME includes a SIP client. SIP (Session Initiation Protocol) is a standardised signalling protocol for controlling communication sessions over a network, and is particularly used to provide multimedia communications (e.g. Voice over IP (VoIP)) over Internet Protocol (IP) networks.

Each ME 10 or at least one of the MEs 10 operating in the system includes a subscriber identity module, SIM, 20 which in turn includes a SLM security module SLM-SM, 22. The SLM security module 22 may be embodied as an application program code applet, executed by a processing device implemented in the SIM 20. The SLM security module 22 is configured to operate in accordance with certain aspects or steps of the presently disclosed method.

In addition to the security module, the SIM 20 may contain other regular features of a SIM, as will be known to persons skilled in the art. Hence, the SIM 20 may be a removable smart card with a processing device and a memory, storing i.a. an international mobile subscriber identity (IMSI), security authentication and ciphering information, temporary information related to local networks, information related to available services, and user credentials such as PIN and PUK codes.

Each ME 10, or at least one of the MEs 10 operating in the system 1, further includes a SIP Location Manager, SLM, 32. The SLM 32 may be embodied as an application program ("app") contained in a memory and executed in an application software environment of the ME 10. For instance, the SLM 32 may be an application program running under a mobile operating system such as Android or Apple iOS, or any other operating system suitable for use with the mobile equipment ME 10. The SLM 32 may be configured to operate in accordance with certain aspects or steps of the presently disclosed method.

The mobile communication system 1 further includes at least one (as illustrated) or a plurality of SIP servers 50. A SIP server is a computational device providing services to SIP clients, e.g. a SIP client provided in an ME 10.

The mobile communication system 1 further includes at least one or a plurality of mobile network operators 60 with Home Location Register HLR 70. Each mobile network operator 60 included in the system, or at least some of the mobile network operators 60, may be configured with Twin SIM or multiple-SIM type subscriptions.

Further, the mobile communication system 1 includes a SIP Location Register SLR 40, which is configured to operate in accordance with certain principles of the presently disclosed method, as explained later. Typically, the SLR 40 includes a computer processing device which is configured to execute computer processing instructions which causes the SLR 40 to perform certain aspects or steps of the presently disclosed method.

Functional aspects of the SLR 40, SLM 32 and the SLM-SM 22, and the functional interaction between these modules or elements, are discussed in the following.

The SIM 20, which is identified by an IMSI, is arranged to provide a first password parameter in a SIP Registration Message. To this end, the SLM-SM 22, included in the SIM, is configured to perform steps of encrypting, using a key, a variable derived from the IMSI, and providing the first password parameter as a result of the encrypting step. The encrypting step may include deriving the variable from the IMSI by an XOR operation of the IMSI with a seed, or alternatively, the variable may equal the IMSI.

In an aspect, the SIM 20 may be arranged and interconnected in the ME 10, and SLM-SM 22 may be further configured to calculate an ME security code by an XOR operation of the first password parameter and an identity of the ME.

The ME 10 comprises a SIM 20 which is configured as described above. The ME 10 further comprises the SLM 32, which may be configured to receive the ME security code; perform an XOR operation of the ME security code and the identity of the ME, and provide a second password parameter as a result of the XOR operation. The identity of the ME may be an IMEI, or it may be derived from the IMEI.

The mobile communication system 1 includes an ME 10 which is configured as described above, the SIP server 50 and the SLR 40. The ME 10, SIP server 50 and SLR 40 are communicatively interconnected. Further, the SLR 40 may be configured to perform a process for SIP client presence and HLR update for mobile operators MSISDN. Such a process may include the following steps:

When a SIM 20 is inserted in a ME 10, the SLM-SM 22 reads the ME identity. If the ME identity is not equal to the previously stored ME identity, the SLM-SM 22 sends a SMS to the SLR 40 indicating that the SIM 20 is inserted in a new ME 10. The SLR 40 sends a message Over-The-Air (OTA) to the SLM-SM 22 in order to request a ME security code. The message contains a seed. The message is transported by use of SMS, formatted and protected according to GSM 03.48. The subscriber's MSISDN is used as the destination address for the SMS.

The SLM-SM 22 derives a variable from the IMSI by an XOR operation of the IMSI with the received seed. The IMSI is taken from EF_IMSI file on the SIM card. The variable is encrypted, using a secret key.

The SLM-SM 22 will then calculate an ME security code by an XOR operation of the password parameter and an identity of the ME, i.e. the IMEI received from the ME.

The ME security code 24 are then sent to the SLR 40 as a GSM 03.48 response message.

SLR 40 stores the security code and generates a unique provisioning code.

The provisioning code and the addresses to the SIP server 50 and the SLM-SM 22 is sent to the ME 10 as an ordinary text SMS. The parameters is formatted into a clickable link to be executed by the SLM 32 running on the ME 10. The subscriber's MSISDN is used as the destination address for the SMS.

The next step depends on a user interaction. If the user clicks on the link in the received SMS, the SLM 32 is invoked and it will establish a connection to the SLR 32. A message containing the provisioning code will be sent to the SLR 32. The SLR 32 will check whether the received provisioning code is equal with the provisioning code sent to the ME 10 in the SMS. If so, configuration data and the ME security code 24 for this subscriber is sent back to the SLM 32. The configuration data consists of the MSISDN and SIP server address.

The SLM 32 acquires an ME identity from the ME (i.e. the IMEI value) and derives the second password parameter by an XOR operation of the ME security code and the identity of the ME.

The SIP Authentication is a challenge-based mechanism. The SIP Server 50 will challenge the SLM 32 with a realm and a "nonce". The SLM 32 has a username within this realm, and it calculates a response based on a number of data, including a "secret" which in this case is the second password parameter. The SIP server 50 uses Radius to carry out the authentication.

The SLR 40 will receive the second password parameter included in the Registration 34 from the SLM 32 via the SIP server 50.

The SLR 40 checks that the SIP authentication response parameter is based on the SIP password as an ordinary Radius Server functionality. If not, the SIP registration will fail.

If it matches, the following checks will be made:
decrypting the second password parameter using the key;
performing an XOR operation of the decrypting result with the seed;
comparing the result of the XOR operation with the IMSI; and
Upon match, determining that the SIM 20 and the SLM 32 are co-located in the same ME 10 and the following will be performed:
  A mobility management MAP sequence of messages will be exchanged with the subscriber's Mobile Operator. The mobility management will update the Operator's HLR 70 related to the Twin IMSI, indicating that the SIP service is available.
  An acceptance from the HLR 70 containing Insert_Subscriber_Data initiates the Access_Accept message to the SIP server Further aspects of the system, related to SIP location management, will be described in the following. In these aspects, the SLR 40 may be configured to perform certain additional steps, related to SIP location management.

The system may further comprise a mobile operator core network including a HLR, enabling communication between the SLR 40 and the HLR 70.

In an aspect, the SLR 40 is configured to transmitting a location update message to the HLR, the location update message containing an identity of the SLR 40 as a VLR address. The SLR 40 is also configured to receiving an accept message from the HLR 70, and upon receipt, sending an access accept message to the SIP server.

In a further aspect of the system, the SLR 40 is also configured to receiving a request for routing information from the HLR 70, and upon receipt, transmitting an alive request to the SLM 32. Further, upon lack of response from the SLM 32 within a predetermined timeout period, the SLR 40 is configured to indicating that the ME 10 is currently not available.

In another aspect, upon receipt of an alive response from the SLM 32 within the predetermined timeout period, the SLR 40 may be configured to indicating that the ME 10 is currently available.

Features relating to SIP location management have also been described with reference to FIG. 3 below.

Figure 2:
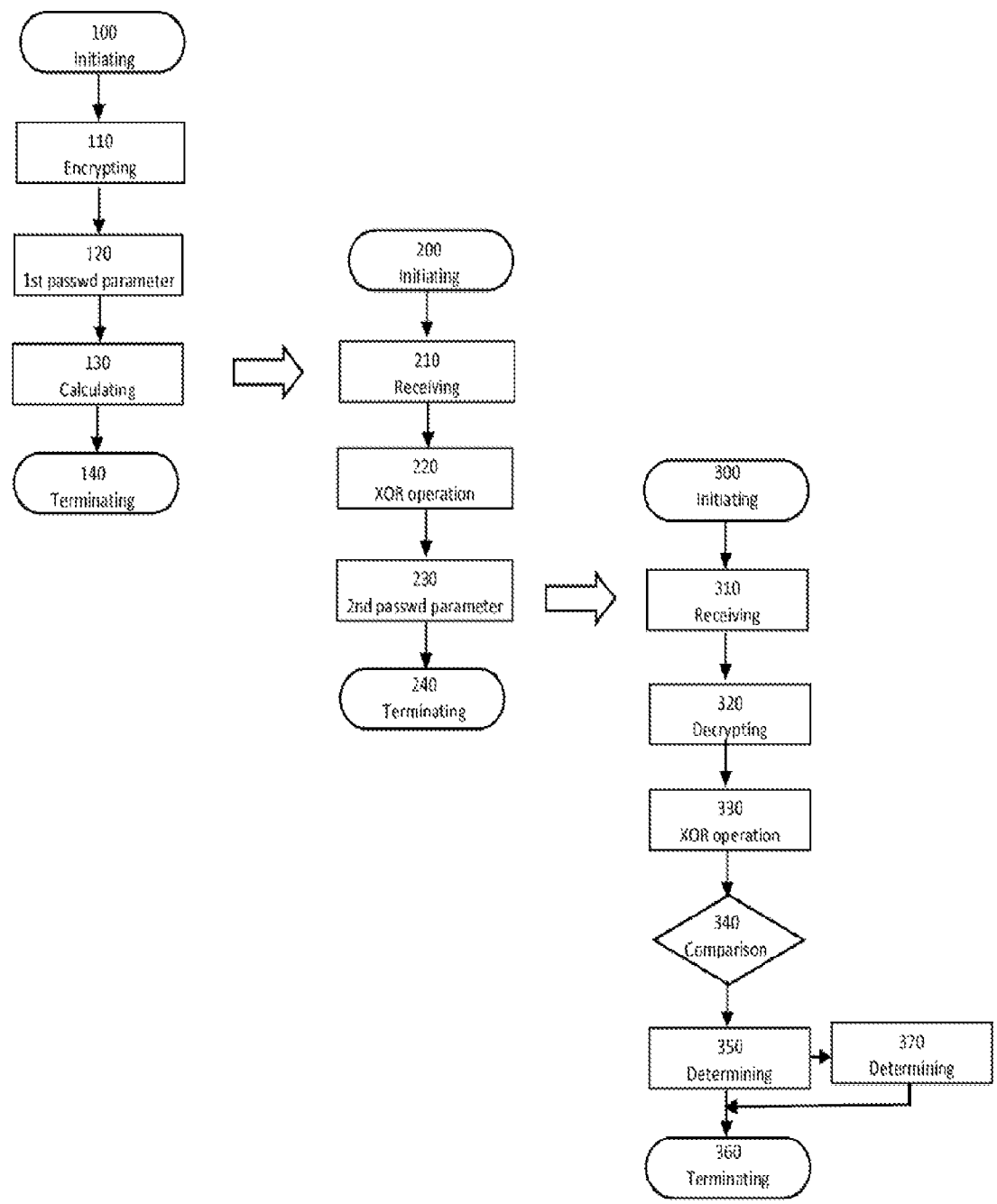
FIG. 2 is a schematic flow chart illustrating principles of a method for determining that a SIM and a SIP client are co-located in the same mobile equipment.

FIG. 2 is a schematic flow chart illustrating principles of a method for providing a password parameter derived from the mobile subscription IMSI associated with the MSISDN to be used in SIP Registration.

The leftmost column of steps, starting at the initiating step 100, are performed by a security module, SLM-SM 22, included in a subscriber identity module, SIM 20. The SIM 20 has an IMSI. The SIM 20 may be operatively arranged in a mobile equipment, ME 10.

The SLM-SM receives a message Over-The-Air (OTA) from the SLR requesting a ME security code. The message might contain a seed.

First, in the encrypting step 110, a variable derived from the IMSI is encrypted, using a key. The encrypting step 110 may include deriving the variable from the IMSI by an XOR operation of the IMSI with a seed. In a particular embodiment, the variable equals the IMSI. The IMSI is taken from EF_IMSI file on the SIM card.

Next, in the password parameter step 120, the first password parameter is provided as a result of the encrypting step.

Optionally, the method further comprises the calculating step 130, also performed by the SLM Security module 22.

The calculating step 130 includes calculating an ME security code by an XOR operation of the first password parameter, provided in the password parameter step 120, and an identity of the ME.

The ME security code are then sent to the SLR 40.

The steps performed at the SLM-SM 22 may be terminated at the terminating step 140. Alternatively, the steps may be reiterated.

The central column of steps in FIG. 2, starting at the initiating step 200, illustrates further steps performed by a SIP client location manager, SLM 32, which is included in the ME 10.

SLR 40 stores the ME security code received from the SLM-SM 22 and the stored ME security code is sent to the SLM 32.

First, in the receiving step 210, the ME security code calculated in step 140 is received at the SLM 32.

The SLM 32 acquires an ME identity from the ME 10 (i.e. the IMEI value).

Next, in the XOR operation step 220, an XOR operation is performed of the ME security code received in the receiving step 210 and the identity of the ME 10.

Subsequently, in the second password parameter providing step 230, a second password parameter is provided in the SLM 32 as a result of the XOR operation.

The identity of the ME 10 may, in an aspect, be an IMEI. In an alternative aspect, the identity of the ME may be derived from the IMEI.

The steps performed at the SLM 32 may be terminated at the terminating step 240. Alternatively, the steps may be reiterated.

The rightmost column of steps in FIG. 2, starting at the initiating step 300, illustrates further steps performed by a SIP Location Register, SLR.

In this aspect, a SIP server 50, a SIP Location Register, SLR 40, and the ME 10 are communicatively interconnected. Further, a process, for SIP client presence and HLR update for mobile operators MSISDN is performed by the SLR.

The SIP Authentication is a challenge-based mechanism. The SIP username is based on the MSISDN and a domain name.

The SIP Server will challenge the SLM with a realm and a "nonce". The SLM has a username within this realm, and it calculates a response based on a number of data, including a "secret" which in this case is the second password parameter. The SIP server uses Radius to carry out the authentication.

First, the SRL may check that the SIP authentication response parameter is based on the SIP password as an ordinary Radius Server functionality. If not, the SIP registration will fail.

The process includes the following steps:

First, in the receiving step, 310, the second password parameter, provided by the SLM 32, is received from the SLM 32 via the SIP server.

Further, in the decrypting step 310, the second password parameter is decrypted, using the key.

Further, in the XOR operation step 330, an XOR-operation is performed of the result of the decrypting step 310 with a seed.

Then, in the comparison step 340, the result of the XOR operation is compared with the IMSI. Upon match between the result of the XOR operation and the IMSI, determining step 350 is performed. Otherwise step 370 is performed.

In the determining step 350 the SLR determines that the SIM 20 and the SLM 32 are co-located in the same ME. Upon match, it is determined that the SIM and the SIP client are co-located in the same mobile equipment, ME:

The following may be performed:
A mobility management MAP sequence of messages will be exchanged with the subscriber's Mobile Operator. The mobility management will update the Operator's HLR related to the Twin IMSI, indicating that the SIP service is available.
An acceptance from the HLR 70 containing Insert_Subscriber_Data initiates the Access_Accept message to the SIP server indicating successful authentication.

In the determining step 370 the SLR determines that the SIM 20 and the SLM 32 are not co-located in the same ME or that the second password is not derived from the first password generated a the SIM 20 co-located in the same ME as the SLM 32 that submitted the second password to the SIP server 50. A Radius response is sent back to the SIP server indicating SIP registration failure.

The steps performed at the SLR may be terminated after either after the determining step 350 or the determining step 360, at the terminating step 360. Alternatively, the steps may be reiterated.

Figure 3:
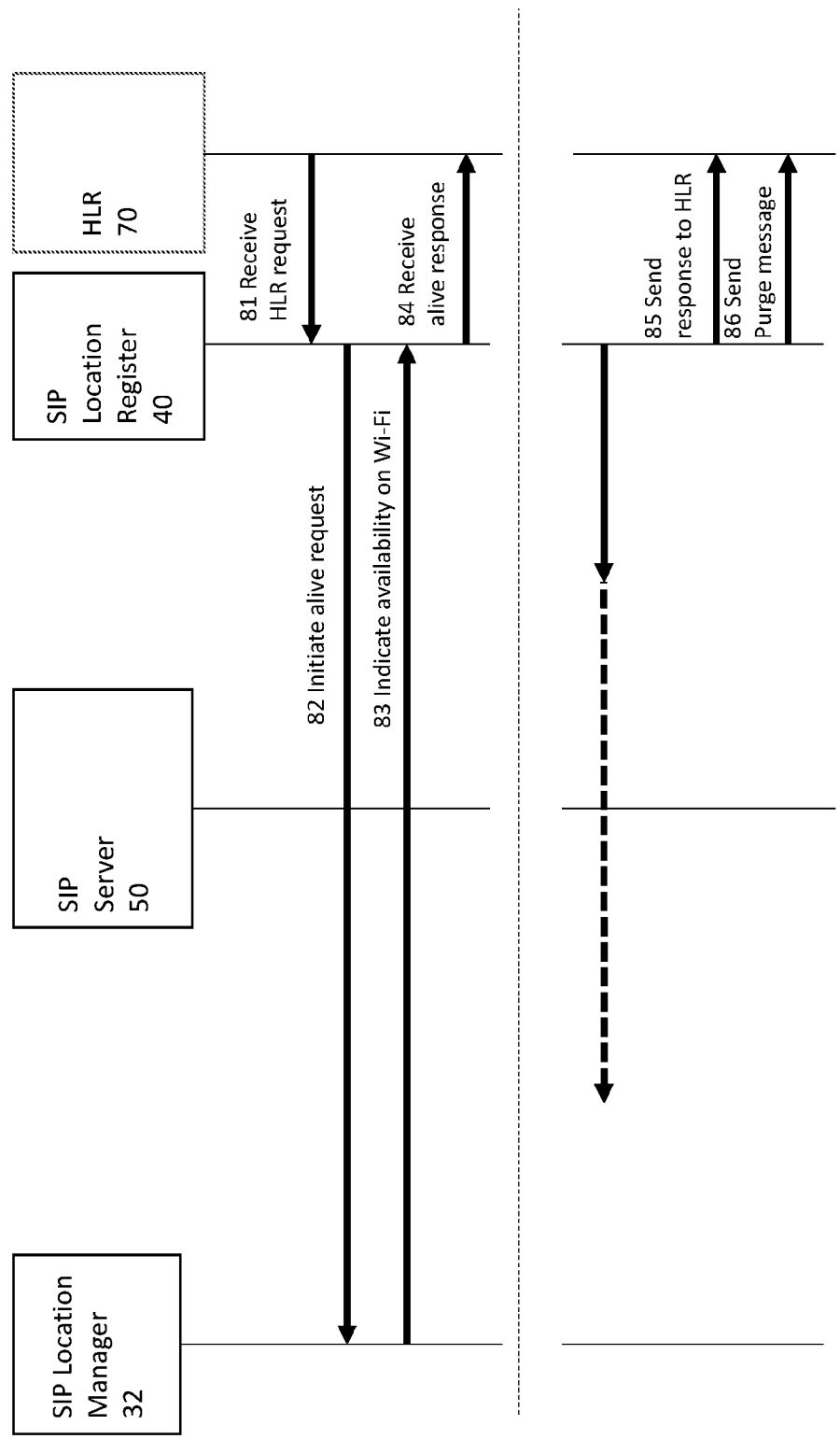
FIG. 3 is a schematic block diagram illustrating further aspects of a mobile communication system, in particular steps that may be performed by the SLR, relating to SIP location management.

FIG. 3 is a schematic block diagram illustrating further aspects of a mobile communication system, in particular further aspects related to SIP location management using the SIM 20 disclosed in the present specification.

The mobile communication system is basically of the type disclosed with reference to FIG. 1 and the corresponding description. Hence, the system includes at least one ME 10 with a SIM 20, a SIP server 50 and a SIP Location Register, SLR, 40, the ME 10, SIP server 50 and SLR 40 being communicatively interconnected.

FIG. 3 illustrates aspects related to interaction between a HLR 70 and a SLR 40 initiated from an incoming call towards and MSISDN received at the mobile operator whereas the MSISDN is available on an SLM 32.

These aspects and functions are particularly achieved by configuring the SLR 40 to perform certain steps as illustrated in FIG. 3.

In step 81, the SLR 40 receives a Send_Routing_Information_request from the home mobile operator HLR 70.

In step 82, the SLR 40 initiates an alive request towards the SLM 32.

In step 83, an Is_Alive response from the SLM 32 will indicate that the ME 10 is available on Wi-Fi. Lack of response from the SLM will indicate that the ME 10 is currently not available on Wi-Fi.

In step 84, the SLR 40 receives an alive response from the SLM 32 indicating that the ME is currently available on Wi-Fi and sends a response to the HLR 70 including a valid mobile subscriber roaming number in the Send_Routing_Information_Response message.

In step 85, the SLR 40 sends a response to the HLR 70 including a Send_Routing_Information_Response with no mobile subscriber roaming number.

In step 86, the SLR 40 sends a Purge message towards the HLR 70.

The invention has been described above as exemplary detailed embodiments. People skilled in the art will recognize that many alterations and variations are possible within the scope of the appended claims.

The invention claimed is:

1. A method for determining that a SIM and a SIP client are co-located in the same mobile equipment, ME,
wherein a SIP server, a SIP Location Register, SLR, and the ME are communicatively interconnected, the SIM being arranged in the ME, the SIM having an IMSI,
the method comprising the following steps performed by a security module, SLM-SM, included in SIM:
encrypting, using a key, a variable derived from the IMSI,
providing a first password parameter as a result of the encrypting step; and
calculating an ME security code by XOR operation of the password parameter and an identity of the ME;
the method further comprising the following steps performed by a SIP client location manager, SLM, included in the ME:
receiving the ME security code;
performing an XOR operation of the ME security code and the identity of the ME, and
providing a second password parameter as a result of the XOR operation;
the method further comprising a process, performed by the SLR, for SIP client presence and location update for mobile operators MSISDN, the process including:
receiving the second password parameter from the SLM via the SIP server;
decrypting the second password parameter using the key;
performing an XOR-operation of the decrypting result with a seed;
comparing the result of the XOR-operation with the IMSI; and
upon match, determining that the SIM and the SIP client are co-located in the same ME.

2. The method according to claim 1,
wherein the encrypting step, performed by the SLM security module, includes deriving the variable from the IMSI by an XOR operation of the IMSI with a seed.

3. The method according to claim 1,
wherein the variable equals the IMSI.

4. The method according to claim 1, wherein the identity of the ME is an IMEI or is derived from the IMEI.

5. The method according to claim 1, further comprising, by the SLR,
receiving a request for sending routing information from a HLR; and initiating an alive request towards the SLM; and
determining, based on a response from the SLM, if the ME is available or not available on Wi-Fi.

6. The method according to claim 5, further comprising, by the SLR,
if the ME is available on Wi-Fi, sending to the HLR a response including a valid mobile subscriber roaming number.

7. A mobile communication system, including:
a mobile equipment, ME, a SIP server, a SIP Location Register, SLR,
the ME, SIP server and SLR being communicatively interconnected,
the ME including a SIM and a SIP client location manager, SLM,
the SIM being arranged in the ME, the SIM having an IMSI,
the SIM including a security module, SLM Security Module, which is configured to
encrypting, using a key, a variable derived from the IMSI,
providing a first password parameter as a result of the encrypting step, and
calculating an ME security code by an XOR operation of the password parameter and an identity of the ME;
the SLM being configured to:
receiving the ME security code;
performing an XOR-operation of the ME security code and the identity of the ME, and
providing a second password parameter as a result of the XOR operation,
wherein the SLR is configured to perform a process for SIP client presence and HLR update for mobile operators MSISDN, the process including:
receiving the second password parameter from the SLM via the SIP server;
decrypting the second password parameter using the key;
performing an XOR-operation of the decrypting result with a seed;
comparing the result of the XOR-operation with the IMSI; and
upon match, determining that the SIM and the SIP client are co-located in the same ME.

8. The system according to claim 7,
wherein the SLM security module is configured to, in the encrypting step, deriving the variable from the IMSI by an XOR operation of the IMSI with a seed.

9. The system according to claim 7,
wherein the variable equals the IMSI.

10. The system according to claim 7, wherein the identity of the ME is an IMEI or is derived from the IMEI.

11. The system according to claim 7, further comprising a mobile operator core network including a HLR,
wherein the SLR is further configured to
transmitting a location update message to the HLR, the location update message containing an identity of the SLR as a VLR address,
receiving an accept message from the HLR, and upon receipt, sending an access accept message to the SIP server.

12. The system according to claim 11,
wherein the SLR is further configured to
receiving a request for routing information from the HLR, and upon receipt, transmitting an alive request to the SLM,
upon lack of response from the SLM within a predetermined timeout period, indicating that the ME is currently not available on WiFi.

13. The system according to claim 11,
wherein the SLR is further configured to
receiving a request for routing information from the HLR, and upon receipt, transmitting an alive request to the SLM, and
upon receipt of an alive response from the SLM, indicating that the ME is currently available on WiFi.

14. The system according to claim 7,
wherein the ME is a portable communication device which is enabled to communicate by mobile communication.

* * * * *